2,649,012

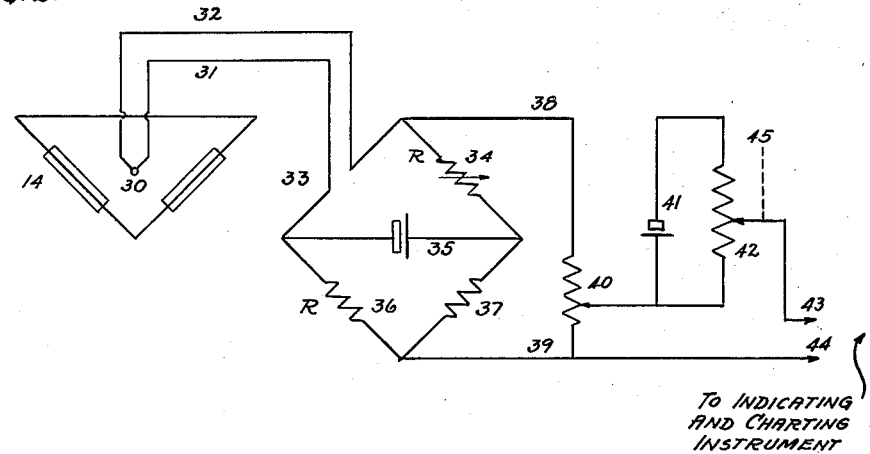
Fig. 2.
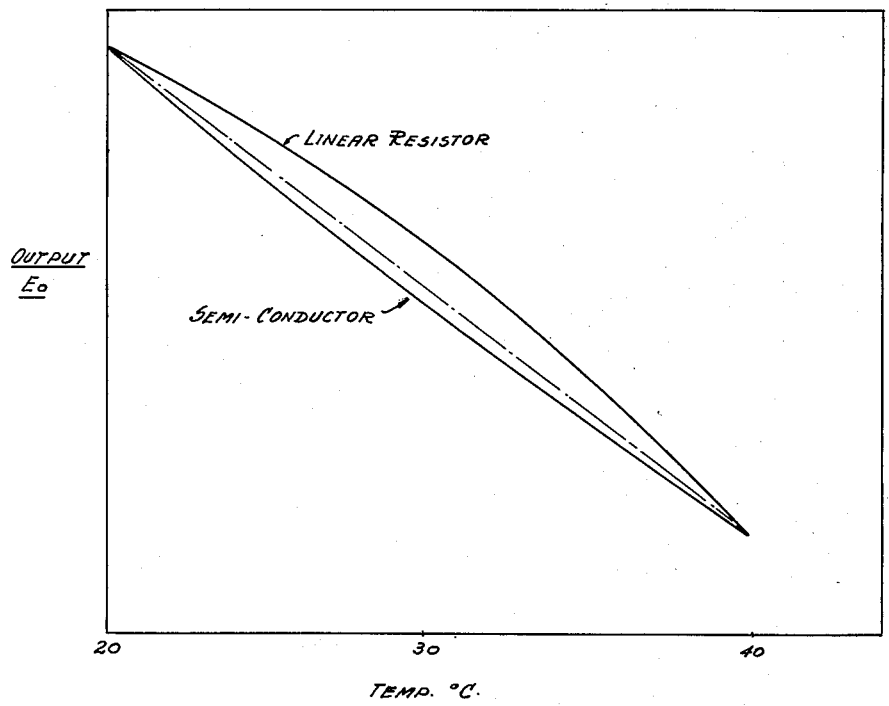
Fig. 3. BRIDGE OUTPUT USING SEMI-CONDUCTOR AND A LINEAR RESISTOR
INVENTOR.
PHILIP D. SCHNELLE
BY Herman O. Bauermeister
attorney Patented Aug. 18, 1953

UNITED STATES PATENT OFFICE 2,649,012

ELECTRICAL TEMPERATURE COMPENSATION IN RECORDING REFRACTOMETERS

Philip D. Schnelle, Texas City, Tex., assignor to Monsanto Chemical Company, St. Louis, Mo., a corporation of Delaware Application June 5, 1950, Serial No. 166,236

5 Claims. (Cl. 88—14)

This invention relates to the art of refractometry and particularly to apparatus useful therefor. An object of the invention is to improve refractometric devices by provision of temperature compensation means therefor.

This invention provides a liquid refractive index testing device that is durable, simple in construction, economical to manufacture, continuous and effective in its operation and adaptable for operation in combination with control instruments and other means to regulate and control chemical processing operations.

The present apparatus and method of measuring and continuously indicating the index of refraction is of importance in processes used in petroleum and chemical manufacturing. Examples of such processes wherein the present apparatus is useful are the manufacture of styrene from ethylbenzene by catalytic dehydrogenation, the various cyclization, aromatization and other procedures in which the types of chemical bonds in the molecule are modified, as well as others. The present apparatus and method are also adaptable to the analysis of mixtures involving amines, nitroparaffins and halogen or nitrile-substituted compounds. The system may also be used in conjunction with extraction operations such as are carried out in obtaining pharmaceutical products, and in the manufacture of lubricating oil from various petroleum fractions to secure the separation of paraffinic from naphthenic components which differ significantly in refractive index.

In the measurement of refractive index of fluids in industrial processing, it has been a disadvantage of prior art refractometers that large errors occur when the fluids are subjected to variations in temperature. Such variations, even though of small magnitude, very materially change the value of the refractive index. In industrial processes such temperature variations are inescapable and may occur very rapidly and unpredictably. Consequently, refractometric instruments are subjected to considerable error unless such temperature variations may be eliminated. It has been attempted in earlier refractometers to mitigate the effects of temperature variations by bringing the test fluid to a constant temperature, such as by bringing the sample through a conduit maintained at a constant temperature. Such methods, however, introduce additional equipment and are difficult to maintain particularly when the instrument is used in the field.

It has also been attempted in prior art devices to correct for temperature deviations of the test fluid by various optical means, but such expedients have also rendered the instrument very cumbersome, particularly where the instrument may be exposed to shocks and vibration, such as when mounted in a manufacturing plant. For this reason the prior art compensating devices have been unsatisfactory, both as to accuracy and speed of response and in the delicate character of the control modification, so that the instrument is difficult to utilize in industrial processes.

It has now been found that a refractometer may be operated by a method in which a beam of light, subject to angular deviation as the result of changes in refractive index may be expressed as an electrical signal, and that such electrical signal may be modified by the effects resulting from temperature variations of the test fluid. The electrical temperature compensating system of the present invention is desirably utilized in combination with a refractometer in which a light tracking system operates by means of reciprocal light-sensitive elements which function in reciprocal relationship, so that deviation of the light beam results in an increase in the amount of light upon one of the light-sensitive elements while at the same time causing a decrease in the amount of light received on the other of the pair of light-sensitive elements.

The improvement described above in the process and apparatus for using reciprocal light-receiving elements in refractometry is the subject matter of copending applications Serial No. 166,237, filed June 5, 1950, and Serial No. 794,004, filed December 26, 1947, and assigned to the same assignee as is the present application.

The above basic process and apparatus have now been improved by providing in or adjacent to the prism a semi-conductor which may be provided as a resistance bulb (commonly called a thermistor) connected into a Wheatstone bridge circuit so as to provide an electrical voltage which varies linearly with respect to temperature. Semi-conductors and their use as resistors are described in Seitz, Modern Theory of Solids, pages 63–72 (McGraw Hill, 1940) and by Rosenberg in Electronic Engineering, 19, 185–187 (1947).

One advantage of the use of semiconductors or thermistors for refractive index-temperature compensation is the very high rate of response to temperature changes. By this means it is possible to equal the speed of response of the refractive index sensing means described more particularly in the above identified patent applications.

By the combination of semi-conductors as the temperature compensating means in conjunction with the light tracking system, described above, it is possible to obtain complete temperature compensation despite very rapid transient temperature changes.

In the combination in which the temperature correcting means are utilized in the present invention the semi-conductor resistance bulb or thermistor is connected electrically in the refractive index sensing system so that the ultimate electrical signal which is realized is related directly to the true refractive index being corrected for variations of temperature however minute. The present system, therefore, has the advantage that even through a wide temperature range, the bridge output is linear and may be impressed directly upon the electrical signal obtained from the sensing or indication of refractive index.

The invention will be described in greater detail in conjunction with the drawings which illustrate typical diagrammatic and semi-diagrammatic arrangements of apparatus which may be used to carry out the process of the present invention.

In the accompanying drawings, Fig. 1 is a diagrammatic view of a device according to the invention using a hollow prism to refract the light beam in accordance with variations in refractive index of a test fluid passing through such prism.

Fig. 2 is a circuit drawing utilizing the signal obtained from the temperature compensation system and being impressed upon the electrical signal characteristic of the refractive index of a test fluid.

Fig. 3 shows the substantially linear effect of temperature variation as related to Wheatstone bridge output when employing a semi-conductor.

Figure 1:
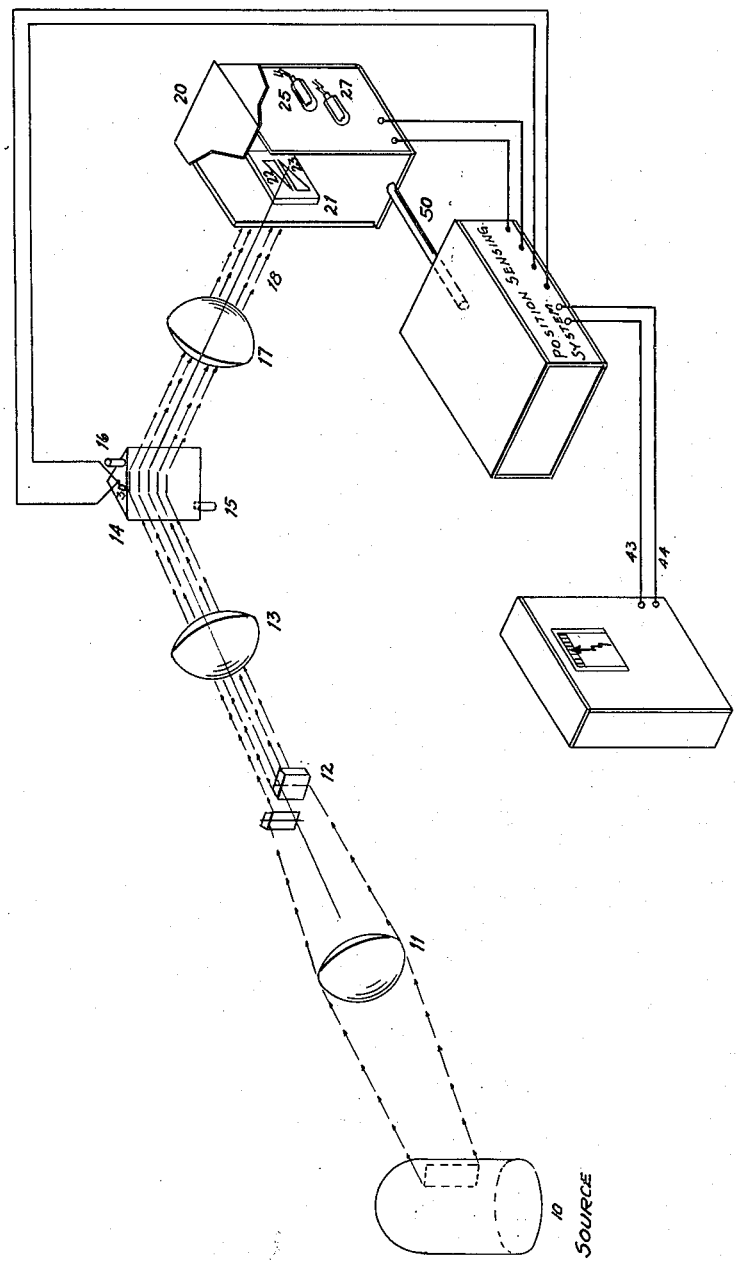

Referring to Fig. 1, a light source, preferably monochromatic, 10 emits a beam of modulated light, although this may be a continuous light source interrupted by means of a mechanical chopper. The beam of light is passed through a condensing lens 11, a slit 12 which may be adjusted or fixed as desired and a collimating lens 13 to reach the prism system. While I may employ a single prism 14, I can also take advantage of the greater deviation which is made possible by the use of a plurality such as a pair of prisms. The liquid which is to be tested may be passed directly from a portion of a process stream to the apparatus, which may also be provided with control means responsive to changes of refractive index, thereby enabling corrections to be made to the process. The test liquid may be passed into the prism at conduit 15 and leave the prism at conduit 16. From the prism the refracted light passes through the condensing lens 17 as a narrow ribbon or beam of light 18 and enters the detection or tracking system. The light detection system includes a housing 20 and a slit holder or wedge mask 21, on which is mounted a slit system such as the two wedge slits 22 and 23. Other reciprocal light elements or geometric slits may also be utilized. The beam of light 18 entering the slit system is there divided into two parts which proceed, respectively through the two slits to individual light-responsive elements such as two light-responsive cells 25 and 27. However, the light-responsive elements may also be situated in a single glass case such as a twin element phototube.

The reciprocal light openings or slits 22 and 23 are situated across the path or sweep of the ribbon of light leaving the prism. Consequently, the angular displacement of light in response to changes in refractive index results in a sweeping of the ribbon of light across the light openings or slits. However, it is essential that some light pass to each of the two openings regardless of the angularity of the light ribbon. The reciprocal relation is thus obtained throughout the possible light-swept area, i. e., that a gain in light to one slit is accompanied by a loss of light to the other.

Fig. 2 shows in diagrammatic form a typical circuit which may be employed in carrying out the process of the present invention. The circuit shows an embodiment by means of which the signal derived from the semi-conductor such as the type mounted in a small bulb, serving as an electrical resistance in a Wheatstone bridge combination may be employed as an electrical effect or signal output impressed upon the signal obtained from the refractive index sensing means.

In Fig. 2 the prism 14, through which the beam of light is refracted, is equipped with a semi-conductor type resistance bulb 30 which is situated within the prism so that the true temperature of the fluid therein may be measured. The thermistor 30 may also be situated in close proximity to the prism, such as in the fluid conduit to the prism. Leads 31 and 32 connect the semi-conductor element 30 with a Wheatstone bridge generally indicated as 33 and equipped with a variable resistance 34 to provide for the adjustment of the circuit at a reference temperature. The Wheatstone bridge is also equipped with the conventional battery 35 and resistances 36 and 37. The output from the Wheatstone bridge 38 and 39 may be varied by variable resistor 40 to achieve the proper degree of compensation. The output from the bridge system 38 and 39 is hooked in series with the refractive index sensing slidewire 42 which is positioned by mechanical linkage 45 to the optical wedge mask or light beam tracking system to the position sensing system and amplification. Element 45 may be a separate unit, or may be combined with an actuating thrust rod 50, as is described in greater detail in copending application, Serial No. 794,004. Leads 43 and 44 connect to the indicating system, such as indicating potentiometer.

The operation of the system of the present invention in response to a change in refractive index of the test fluid may be summarized as follows. Changes in composition or changes in the temperature of the test liquid will cause the light beam emergent from the prism to be refracted or bent from its prior angular position to a new position. The magnitude of such deviation is a measure of the change in refractive index which has taken place. Changes in the composition of the test fluid itself are, therefore, reflected as differences in the reading of refractive index so that the indicating system of the apparatus will achieve a new rest position corresponding to a new value in refractive index. However, the tracking system, such as is described in copending application Serial No. 794,004, will always return to the same relative position with respect to the light beam in accordance with the null balance principle, so that greater accuracy is possible since the same conditions prevail in the setting corresponding to the reading of a value of refractive index.

Fig. 3 illustrates the nature of the electrical response of the Wheatstone bridge circuit when employing a semi-conductor. The relationship is seen to be far closer to that of a straight line (center dotted line), thus providing greater accuracy. For comparison, the figure also shows the temperature response when using a linear resistor in the same relationship.

It is a preferred embodiment of the invention to utilize the above method and apparatus in the determination of the proportion of olefinic hydrocarbons which are present in a mixture of hydrocarbons, and particularly in the determination of the proportion of styrene in admixture with ethylbenzene and other hydrocarbons. Styrene is an example of an olefinic hydrocarbon compound which is differentiable from saturated hydrocarbons because of its characteristic value of refractive index.

Since many changes could be made in the above methods and apparatus without departing from the scope of the invention, it is intended that all matter contained in the above description shall be interpreted as illustrative and not in a limiting sense and that the invention is to be construed broadly.

What is claimed and is desired to be protected by Letters Patent of the United States is:

1. In a refractometer in which refractive index of a fluid is indicated as an electric signal, the improvement which comprises the combination of means for measuring deviations in temperature of the said fluid as a difference from a reference standard, means for transforming said deviations in temperature into deviations in a second signal, means for impressing algebraically upon the first said signal the second said signal, the algebraic sum of which corresponds to a temperature-corrected value of the refractive index.

2. In a refractometer in which the refractive index of a fluid is detected as changes in a measuring electric signal, the improvement which comprises the combination of means for measuring deviations in temperature of the fluid referred to a reference standard, by means of a semi-conductor type, temperature-sensitive resistor which is situated in one arm of a Wheatstone bridge, the output of which Wheatstone bridge is an electric signal which is substantially linearly proportional to the deviations in temperature from the reference standard, and means for impressing algebraically upon the first said electric signal the second said electric signal, the algebraic sum of which corresponds to a temperature-corrected value of refractive index.

3. In a refractometer in which changes of refractive index of a fluid are detected as changes in a measuring electric signal, the combination of means for measuring deviations in the temperature of the said fluid referred to, a reference standard by means of at least one thermocouple, the output of which is an electric signal, and means for impressing algebraically upon the first said electric signal the second said electric signal, the algebraic sum of which corresponds to a temperature-corrected value of refractive index.

4. In a refractometer in which changes of refractive index of a fluid are detected as changes in a measuring electric signal, the combination of means for measuring deviations in temperature of the fluid referred to a reference standard by means of a resistance thermometer, the output of which is an electric signal, and means for impressing algebraically upon the first said electric signal the second said electric signal, the algebraic sum of which corresponds to a temperature-corrected value of the refractive index.

5. A device according to claim 1 including control means to modify the refractive index of the said fluid passing through the refractometer.

PHILIP D. SCHNELLE.

References Cited in the file of this patent

UNITED STATES PATENTS

| Number | Name | Date |
|---|---|---|
| 1,363,267 | Porter | Dec. 28, 1920 |
| 1,617,416 | Pierce | Feb. 15, 1927 |
| 2,065,365 | Doyle et al. | Dec. 22, 1936 |
| 2,102,030 | Quereau | Dec. 14, 1937 |
| 2,413,208 | Barnes | Dec. 24, 1946 |
| 2,421,854 | Seaman | June 10, 1947 |
| 2,439,373 | Stearns | Apr. 6, 1948 |
| 2,445,044 | Stamm et al. | July 13, 1948 |
| 2,483,102 | Pierson | Sept. 27, 1949 |